(12) United States Patent
Grossmann et al.

(10) Patent No.: US 9,837,944 B2
(45) Date of Patent: Dec. 5, 2017

(54) METHOD AND DEVICE FOR ADJUSTING AN ACTUATOR MEMBER OF A POSITIONING SYSTEM WITH AN ELECTRONICALLY COMMUTATED ACTUATOR DRIVE

(71) Applicant: ROBERT BOSCH GMBH, Stuttgart (DE)

(72) Inventors: Alex Grossmann, Leonberg (DE); Reiner Schweinfurth, Eppingen (DE); Simon Dierolf, Kirchheim/Teck (DE); Michael Kilger, Abensberg (DE); Ingo Immdendoerfer, Tamm (DE); Udo Sieber, Bietigheim (DE)

(73) Assignee: Robert Bosch GMBH, Stuttgart (DE)

( * ) Notice: Subject to any disclaimer, the term of this patent is extended or adjusted under 35 U.S.C. 154(b) by 0 days.

(21) Appl. No.: 15/316,515

(22) PCT Filed: May 27, 2015

(86) PCT No.: PCT/EP2015/061688
§ 371 (c)(1),
(2) Date: Dec. 5, 2016

(87) PCT Pub. No.: WO2015/185410
PCT Pub. Date: Dec. 10, 2015

(65) Prior Publication Data
US 2017/0163193 A1  Jun. 8, 2017

(30) Foreign Application Priority Data

Jun. 6, 2014  (DE) ........................ 10 2014 210 930

(51) Int. Cl.
*H02P 7/00* (2016.01)
*H02P 21/00* (2016.01)
(Continued)

(52) U.S. Cl.
CPC ............ *H02P 21/00* (2013.01); *F02D 11/107* (2013.01); *F02D 41/00* (2013.01); *G05B 19/00* (2013.01);
(Continued)

(58) Field of Classification Search
CPC .... H02K 21/00; H02K 15/03; H02P 2207/05; H02P 6/16; H02P 21/18; H02P 25/03;
(Continued)

(56) References Cited

U.S. PATENT DOCUMENTS 6,462,491 B1* 10/2002 Iijima ........................ H02P 9/18
318/400.09
6,956,312 B2* 10/2005 Inayama ................ H02K 1/278
29/596
(Continued)

FOREIGN PATENT DOCUMENTS

DE        10197212 T5    4/2004
DE    102011005566 A1    9/2012
(Continued)

OTHER PUBLICATIONS

Schürle, Patrick, International Search Report PCT/EP2015/061688 dated Sep. 2, 2015.

*Primary Examiner* — Bentsu Ro
*Assistant Examiner* — Thai Dinh
(74) *Attorney, Agent, or Firm* — John J. Dresch; Dresch IP Law, PLLC (57) ABSTRACT

A method is proposed for adjusting an actuator (300) of a positioning system (100). The positioning system (100) has an electronically commutated actuator drive (200) which is coupled to the actuator (300), wherein the actuator drive (200) has a permanent magnetic rotor (210), wherein the rotor (210) has a first shaft (212) which extends along a pole
(Continued)

axis (290) of the rotor (210). The actuator drive (200) additionally has an electronically commutated stator (230), wherein the stator (230) can be energized using a space phasor (260), wherein the space phasor (260) has an electric phase and an amplitude, wherein the space phasor (260) is aligned with respect to the first shaft (212) of the rotor (210) around a difference phasing. In order to be able to actuate a predefined position of the actuator, even without sensors to determine the position of the first shaft (212) of the rotor (210), the following steps of the method are thereby provided: setting the difference phasing of the space phasor (260) to an operating difference phasing; setting the amplitude to an operating amplitude, wherein the operating difference phasing and the operating amplitude are set in such a way that the operating difference phasing is less than 45° and that a torque is generated at the rotor (210) suitable for starting up the predefined position of the actuator (300). The invention further relates to a device for adjusting an actuator (300) of a positioning system (100) and a computer program product which contains a program code which, when it is executed by a data processing unit, implements the method according to the invention.

15 Claims, 5 Drawing Sheets (51) Int. Cl.
*F02D 11/10* (2006.01)
*H02P 29/032* (2016.01)
*H02P 25/03* (2016.01)
*G05B 19/00* (2006.01)
*H02P 29/02* (2016.01)
*H02P 3/02* (2006.01)
*F02D 41/00* (2006.01)
*F02B 37/18* (2006.01)
*F02M 26/54* (2016.01)

(52) U.S. Cl.
CPC .............. *H02P 3/02* (2013.01); *H02P 25/03* (2016.02); *H02P 29/02* (2013.01); *H02P 29/032* (2016.02); *F02B 37/186* (2013.01); *F02D 41/0077* (2013.01); *F02M 26/54* (2016.02); *G05B 2219/41321* (2013.01); *H02P 3/025* (2013.01)

(58) Field of Classification Search
CPC ........ H02P 21/00; H02P 29/02; H02P 29/662; H02P 3/02; G05B 2219/41321
USPC ............................ 318/434, 400.14, 437, 538
See application file for complete search history.

(56) References Cited

U.S. PATENT DOCUMENTS

| | | | |
|---|---|---|---|
| 2003/0146727 A1* | 8/2003 | Ishii | G05B 19/02 318/652 |
| 2004/0113584 A1 | 6/2004 | Jinbo | |
| 2013/0033254 A1* | 2/2013 | Shinnaka | H02P 21/146 324/160 |
| 2014/0152229 A1 | 6/2014 | Grossmann et al. | |
| 2014/0159617 A1 | 6/2014 | Grossmann | |
| 2015/0226581 A1* | 8/2015 | Schott | G01D 5/145 324/207.2 |

FOREIGN PATENT DOCUMENTS

| | | |
|---|---|---|
| DE | 102011005774 A1 | 9/2012 |
| DE | 102011118172 A1 | 5/2013 |
| EP | 1555748 A2 | 7/2005 |

* cited by examiner

METHOD AND DEVICE FOR ADJUSTING AN ACTUATOR MEMBER OF A POSITIONING SYSTEM WITH AN ELECTRONICALLY COMMUTATED ACTUATOR DRIVE

PRIOR ART

Brushless electric motors may be used to control mechanical actuators. One example is the use of a brushless direct current motor (BLDC) or an electronically commutated actuator drive, which brings advantages over a conventional mechanically commutated DC motor. These include for example an improved EMC behaviour, lower friction, reduced installation space and lower weight. In general, such a motor is connected to the actual control element or actuator member via a gear mechanism.

Normally, in order to commutate a BLDC motor, information on its rotor position is required at any time. For this, the rotor position is often detected directly at the motor shaft by a rotor position sensor. Alternatively, thanks to the mechanical coupling between the motor and the control element or actuator member, the rotor position can also be determined indirectly by means of a position sensor on the actuator member. Such a positioning system is described for example in DE 10 2011 005 566 A1.

DISCLOSURE OF THE INVENTION

The invention is based on the knowledge that there may be a need to be able to adjust, reliably and precisely, an actuator member driven by a BLDC motor even without continuous determination of the rotor position. In this way, costly sensors in the positioning system may be omitted and the installation space for such a positioning system may be reduced.

There may also be a need to create a positioning system in which, although sensors are provided for determining the rotor position, it is however also possible to adjust the actuator member reliably and precisely even on failure of the position determination. Thus for example there may be a need for permanently and reliably moving the actuator member into any arbitrary position on loss of positional information. Also there may be a need, after loss of positional information, to move the actuator member only to an emergency position, wherein it is possible that the emergency position can only be reached by overcoming a counter-force, for example a spring force.

Advantages of the Invention

This need can be met by the subject of the present invention according to the independent claims. Advantageous embodiments and refinements of the present invention are described in the dependent claims.

According to a first aspect of the invention, a method is proposed for adjusting an actuator member of a positioning system which allows an actuator member, driven via an electronically commutated actuator drive or via a brushless DC motor, to be adjusted reliably and precisely even without continuous determination of the rotor position.

This is achieved in that the positioning system comprises an electrically commutated actuator drive or brushless DC motor which is coupled to the actuator member, wherein the actuator drive has a rotor with permanent magnets, wherein the rotor has a first axis which extends along a pole axis of the rotor, and wherein the actuator drive has an electrically commutated stator. The stator can be energized with a space phasor, wherein the space phasor has an electrical phase and an amplitude, wherein the space phasor is oriented about a differential phasing relative to the first axis of the rotor. The method comprises the following steps for controlling a predefined position of the actuator member:

setting the differential phasing of the space phasor to an operating differential phasing, setting the amplitude to an operating amplitude, wherein the operating differential phasing and the operating amplitude are set such that the operating differential phasing is less than 45°, and a torque is generated which acts on the rotor and is suitable for approaching the predefined position of the actuator member.

The predefined position of the actuator member is reached by rotating the electrical phase of the space phasor about a suitable differential phase angle.

The actuator member may be subjected to a counter-force, i.e. for example have a spring which always exerts a counter-torque on the actuator drive in order to move the actuator member into an original position when the actuator drive is not energized.

The positioning system may for example be a throttle valve, a control of an exhaust gas recirculation valve, a charge movement valve, a general purpose actuator or a screen wiper motor.

The stator may have an integral pole pair count NP, for example NP=1 or NP=2 or NP=3, or other pole pair counts.

The actuator member may be coupled to the actuator drive via a gear mechanism with a gear ratio. The gear ratio may for example be 10:1 or 20:1 or 40:1. However, other gear ratios are possible between 1:1 to 500:1.

With a gear ratio of 1:1 and a pole pair count NP=1, therefore, one rotation of the space phasor about an electrical phase of 360° corresponds precisely to one complete revolution of the actuator member, i.e. a rotation of the actuator member about a mechanical adjustment angle α of also 360°. With a gear ratio of 20:1 and a pole pair count NP=1, 20 complete revolutions of the space phasor, i.e. rotation of the electrical phase by 7200°, correspond precisely to one complete revolution of the actuator member, i.e. a rotation of the actuator member about a mechanical adjustment angle α of 360°. With a gear ratio of 20:1 and a pole pair count NP=2, 40 complete revolutions of the space phasor, i.e. rotation of the electrical phase by 14400°, correspond precisely to one complete revolution of the actuator member, i.e. a rotation of the actuator member by 360°.

In comparison with the prior art, the method has the advantage that the actuator member can be reliably moved to the predefined position without the need to continuously determine the position of the first axis of the rotor or the rotor position. Thus for example, there is no need to install sensors to determine the position in the positioning system, whereby the positioning system can advantageously be constructed more compactly and produced more cheaply.

In other words, it is not necessary to operate the actuator drive or motor for optimum efficiency. This is achieved according to the proposed method in that the space phasor is operated not with a differential phasing of around 90°, but with the smallest possible amplitude. Thus the space phasor is not oriented approximately in the direction of a second axis of the rotor, running transversely to the first axis of the rotor. In this way, the space phasor is not active for torque with its full amount. For efficiency-optimised orientation of the space phasor, precise knowledge of the position of the first axis is required since a differential phasing of around 90° constitutes a labile state: due to the torque caused by the space phasor, the rotor is forced to orient its first axis in the direction of the space phasor, i.e. to reduce the differential phasing.

Rather, according to the proposed method, the space phasor is rotated approximately in the direction of the first axis of the rotor and thus has a differential phasing of less than 45°, ideally of a few degrees, for example 5°. At the same time, the amplitude of the space phasor is extended to an amount which is sufficient to exert a torque on the rotor at the selected operating differential phasing, which is sufficient to overcome the maximum counter-torque occurring and acting on the rotor, which occurs on the path from the position of the actuator member at which the operating differential phasing is set to the predefined position of the actuator member.

With the selected operating differential phasing, only a part of the amplitude of the space phasor which acts in the direction transverse to the first axis of the rotor is active for torque, i.e. a part which results from the sine of the differential phasing multiplied by the total amplitude. Thus the minimum possible operating differential phasing is determined firstly by the maximum counter-torque to be overcome (for example from friction forces in a gear mechanism which couples the actuator member to the actuator drive, or from loading of the actuator member with a counter-force e.g. in the form of a return spring), and secondly by the maximum available amplitude of the space phasor and the constructional design of the rotor (e.g. its magnetic force and length) and the gear ratio. The maximum available amplitude of the space phasor is determined for example by the constructional design of the stator coils or the stator, in particular their resistance, or its pole count. Also, the power supply available and the preparation of the phase voltages, i.e. the end stage of the power supply and its control method, play a role in the maximum amplitude available. This is because finally, these factors influence the maximum current vector achievable in the motor.

The moment is (approximately) linear to the sine of the differential phasing. For a differential phasing of 90°, i.e. sine (90°), the torque $T_M$ is calculated (approximately) as follows:

$$T_M = 3/2 * NP * Km * I,$$

wherein NP is the pole pair count, Km the motor constant, and I the amount of the current vector (with the differential phasing 90°).

A further term is added to the equation depending on motor type and the constructional design of its magnetic circuit. Its effect on the torque however is usually only slight.

Due to the absence of a differential phasing optimised for efficiency, the rotor follows the orientation of the space phasor in quasi-stable equilibrium, and in this way can be turned into any desired position, whereby the actuator member coupled to the rotor can also be turned into any desired position. Thus, advantageously, the precise position information of the rotor is no longer required, but merely a higher value of the amplitude of the space phasor compared with operation at a differential phasing optimised for efficiency.

A refinement of the invention proposes that the positioning system comprises means for detecting a position value of the position of the first axis of the rotor, or the rotor position. The term "position value of the position of the first axis" means the position of the first axis relative to the electrical phase of the space phasor. This advantageously ensures that at least at one time—for example immediately after installation of the rotor in the actuator drive—or at any arbitrary other time, the position of the rotor of the actuator drive can be detected. In this way, the method can be performed particularly reliably.

Thus for example with a positioning system with a gear ratio of 40:1 and a pole pair count of NP=1, the position of the first axis may assume a value between 0° and 14400° (electrical phase) in order to describe one complete revolution (in real space) of the actuator member, or a value of e.g. 0° to 3600° (electrical phase) in order to shift the actuator member mechanically by 90° (in real space). Thus in real space, 10 revolutions of the rotor are required (or 3600° of the space phasor 260 in the electrical phase space) to achieve one rotation of the actuator member by 90° in real space. The position of the first axis of the rotor determined by the means is therefore unambiguously coupled to the position of the actuator member. If for example a position value of 1800° is detected, it is therefore also known simultaneously that the actuator member stands at a positioning angle of 45°.

It may be advantageous to know the position value of the position of the first axis of the rotor precisely at least at one time, since in the case of a gear ratio not equal to 1:1 or a pole pair count not equal to NP=1, ambiguous situations can occur. Thus on a revolution of the electrical phase through 360° each in real space, the space phasor always points in the same spatial direction. According to the proposed method, the rotor is oriented approximately in this spatial direction of the space phasor in real space. Precise knowledge of the position value of the position of the first axis of the rotor relative to the electrical phase then allows determination of the change of electrical phase of the space phasor necessary to adjust the actuator member to the predefined position. If for example the actuator member stands at a position of 45° in real space, five complete revolutions of the rotor (and also of the space phasor) are necessary to reach a position of 90°. The space phasor or the position of the first axis then stands at a position value (of the electrical phase) of 1800° and must be adjusted to 3600°. If the position of the first axis is completely unknown, then in other words there is no knowledge of the electrical phase. Then the rotor may indeed be oriented to the space phasor but it is not easy to determine how many revolutions of the rotor (or space phasor) are required, or by what amount the electrical phase must be adjusted, in order to bring the actuator member to the desired position. In the example outlined above, e.g. after a rotation of the electrical phase from 1800° to a value of 2160° (i.e. by a differential phasing of 360°), the space phasor lies in the same real-space direction as at the necessary value of 3600°. However, the actuator member has not now moved by 45° to 90°, but only by 9° to 54°. The means for determining the position value of the position of the first axis thus advantageously ensure that with the method, the actuator member can safely and reliably be adjusted to any desired predefined position.

Because the means are at least one calibration step for determining a position value, it is advantageously ensured that the position value is determined once for example on start-up of the positioning system or on installation of the rotor in the actuator drive, and the necessary assignment of the electrical phase to the real space direction of the rotor is carried out. Such a calibration method or calibration step may advantageously be performed for example by sensors provided externally, so that the actuator drive as such does not require its own sensors. It is furthermore advantageous that after the calibration step, no further position values need be determined, whereby the method can be performed particularly robustly. For example, the calibration step may be performed after every start-up of the positioning system.

Because the actuator member is completely open at the predefined position of the actuator member, and/or the actuator member comes to rest on a mechanical stop, it is advantageously ensured that the method can particularly reliably set the predefined position of the actuator member. Thus for example it is possible to rotate the electrical phase of the space phasor by a multiple of 360° beyond the actual target value, in order in this way to ensure that the actuator member actually reaches the mechanical stop or the fully open position. On such an over-rotating of the space phasor, the mechanical stop or the fully open position of the actuator member prevents the actuator member from also turning beyond the desired position, corresponding to the space phasor. If however the assumption on the position of the actuator member at the start of the method, which the rotation of the electrical phase of the space phasor is based on, was underestimated, an unambiguously defined position of the actuator member can reliably be reached by over-rotating the space phasor and by the mechanical stop or complete opening of the actuator member. The reaching of such a well-defined emergency operating point is extremely important for the use of the method in many applications, for example in the motor vehicle sector.

Because the predefined position of the actuator member is reached in less than 300 ms, in particular in less than 100 ms, it is advantageously ensured that the method can also be used in time-critical positioning systems, for example in a throttle valve device of an internal combustion engine.

Because the rotation of the electrical phase of the space phasor is controlled such that the depiction of the phase control values over the control time gives a curve which can be differentiated at any time, i.e. in particular the left-side derivative at any time corresponds to the right-side derivative, it is advantageously ensured that the rotor of the actuator drive can reliably follow the phase position of the space phasor, and for example at the start or end of the rotation of the space phasor, the rotor is not trailing as a result of a counter-force application or because of inertia moments. In other words, it is thus advantageously achieved that the actuator member is truly moved to the correct position, and the space phasor does not start to move the rotor only after rotation through a multiple of 360° of the electrical phase position, and the rotor does not shoot beyond the target position at the end of the phase change because of its inertia moment. This embodiment guarantees a gentle start and stoppage of the space phasor movement. Advantageously, this also eliminates jerky or sudden movements of the actuator member which may lead to a high load e.g. on axial bearings and other mechanical components.

According to a second aspect of the invention, a method is proposed for adjusting an actuator member of a positioning system according to the first aspect of the invention, wherein the method is performed only after occurrence of a defined event, and wherein without the occurrence of the defined event for adjusting the position of the actuator member, the space phasor is oriented relative to the first axis of the rotor by a differential phasing which lies in a range between 90°+/−45°, i.e. between 45° and 135°, in particular in a range of 90°+/−20°, i.e. 70° to 110°. Particularly advantageous effects result if, without occurrence of the defined event for shifting the position of the actuator member, the space phasor is oriented relative to the first axis of the rotor by a differential phasing which lies in a range between 85° and 110°.

In comparison with the prior art, the proposed method offers the advantage that in a mode of normal operation which always exists if the defined event does not occur, the positioning system is operated for optimum efficiency, and the advantageous method outlined above is only applied after occurrence of a defined event. The advantage here is that in normal operation of the positioning system, a reduced power consumption is sufficient but after occurrence of the defined event, any predefined position of the actuator member can be reached rapidly and reliably without the need for continuous detection of the position of the first axis of the rotor. Thus for example after occurrence of the defined event, the positioning system can rapidly reach an emergency running point of the actuator member, for example a fully opened position of the actuator member. Advantageously, such an emergency running point—in contrast to conventional emergency running points from the prior art—may also be a position of the actuator member at which a spring force acts on the actuator member which would move the actuator member away from the emergency running point if the actuator drive were not energized, i.e. for example the fully open state of a throttle valve.

A refinement of the method according to the second aspect of the invention proposes that the positioning system contains means for detecting a position value of the position of the first axis, wherein the means for detecting the position value of the position of the first axis are at least one sensor arranged on the actuator member and/or at least one sensor arranged on the actuator drive. This refinement of the invention advantageously achieves that in normal operation, i.e. before occurrence of the defined event, the efficiency-optimised operation of the actuator drive can be set safely and reliably. For example, two or more sensors may be provided for detecting the position value of the position of the first axis of the rotor, so that the system has a redundancy and on failure of one sensor, a position information is still available.

Because the positioning system contains a memory for storage of position values of the position of the first axis, and because on occurrence of the defined event a position value is retrieved from the memory in order to set the operating differential phasing, i.e. a differential phasing of less than 45°, it is advantageously achieved that on occurrence of the defined event, a position value of the position of the first axis of the rotor is reliably available. For example, the defined event may be a malfunction of the sensor or failure of the sensor. In such a case, it is particularly advantageous if position values are available in a memory so that the positioning system can apply an algorithm for a plausibility check for which of the last stored position values still contains a sensible position information. Thus for example, on a gradual failure of the sensor, an algorithm can check from which time the stored position values no longer stand in a plausible correlation to the control signals supplied for controlling the space phasor. In this way, advantageously, a position value suitable for setting the operating differential phasing can be retrieved from the memory and the method according to the first aspect of the invention can be applied.

In other words, in this way it is possible to switch from an efficiency-optimised mode which e.g. is based on detection of position values of the first axis of the rotor by at least one sensor, to an emergency running mode which achieves similar reliability in the control of the actuator member with increased power consumption without the need for detecting the position of the first axis of the rotor via sensors for example.

In a further embodiment of the method, the predefined position may be a position or setting of the actuator member at which the actuator member comes to rest on a mechanical stop. According to the method, this gives a differential phase angle of the electrical phase of the space phasor about which the electrical phase of the space phasor is to be rotated in order to reach the predefined position or setting of the actuator member. The differential phase angle is determined or calculated from the difference between a first electrical phase of the space phasor at the predefined position, and a second electrical phase of the space phasor which the space phasor has at the position value retrieved from the memory plus a positive or negative multiple of 360°, in particular plus 720° or −720°. In this way, it is advantageously ensured that the predefined position of the actuator member is reached with great certainty, even if the position value retrieved from the memory differs significantly from the position value reached in the meantime. By over- or under-rotating the space phasor above or below the actual necessary electrical phase position of the space phasor, the rotor is reliably carried to the mechanical stop. If the actuator member has already reached the mechanical stop, the over- or under-rotating of the electrical phase of the space phasor—in view of the large amplitude of the space phasor set according to the method—at most has the effect that the rotor snaps back by a small amount because of the counter-force acting thereon, but then is again led up to the mechanical stop by the rotating space phasor. In contrast to the prior art, in this way advantageously an emergency running point loaded by a counter-force can also be reached with great certainty. Such an emergency running point loaded by a counter-force may, for example in the case of a throttle valve, be the fully open state of the throttle valve. This may be desirable if in an internal combustion engine, the dosage of the necessary air supply is for example no longer controlled by the opening of the throttle valve but via the stroke of the valves of the internal combustion engine.

According to a third aspect of the invention, a device is provided for adjusting an actuator member of a positioning system. The positioning system has an electrically commutated actuator drive which is coupled to the actuator member. The actuator drive has a rotor with permanent magnets, wherein the rotor has a first axis which extends along a pole axis of the rotor. The actuator drive furthermore has an electrically commutated stator, wherein the stator can be energized with a space phasor, wherein the space phasor has an electrical phase and an amplitude, wherein the space phasor can be oriented about a differential phasing relative to the first axis of the rotor. It is provided that the device is configured to reach a predefined position of the actuator member in that the space phasor can be controlled such that the differential phasing can be set to an operating differential phasing, wherein the space phasor can be controlled such that the amplitude can be set to an operating amplitude, wherein the operating differential phasing and the operating amplitude can be set such that the operating differential phasing is less than 45° and the space phasor generates a torque acting on the rotor and suitable for reaching the predefined position.

In comparison with the prior art, this device advantageously achieves that in a positioning system with an electrically commutated actuator drive, the actuator member can be adjusted reliably and safely without continuous detection of the position of the first axis of the rotor. In this way, the positioning system can be produced particularly compactly and economically, in that for example the sensor arrangement may be omitted. In addition, in this way the actuator member can be controlled particularly rapidly since detection and calculation of the position of the first axis of the rotor is no longer necessary, saving the time used for calculation processes for determining the position information. Also, the power consumption for such a calculation is advantageously reduced.

A refinement of this aspect of the invention provides that the device is configured in normal operating state to reach a predefined position of the actuator member, in that the space phasor can be oriented about a differential phasing of more than 45° relative to the first axis of the rotor, in particular about a differential phasing of more than 70°, wherein the amplitude can be set such that the space phasor generates a torque acting on the rotor and suitable for approaching the predefined position. Furthermore, the device is configured to approach the predefined position of the actuator member only after occurrence of a defined event, in that the operating differential phasing and the operating amplitude can be set such that the operating differential phasing is less than 45° and the space phasor generates a torque acting on the rotor and suitable for approaching the predefined position. This advantageously ensures that in normal operating state, i.e. before occurrence of the defined event, the positioning system can be operated for optimum efficiency and that after occurrence of the defined event, the continuous detection of the position of the first axis of the rotor may be omitted.

In a further embodiment of the device, it is provided that the positioning system comprises means for detecting a position value of the position of the first axis, wherein the means for detecting the position value are at least one sensor arranged on the actuator member and/or at least one sensor arranged on the actuator drive, wherein the positioning system comprises a memory for storage of position values of the position of the first axis, and wherein on occurrence of the defined event, a position value is retrieved from the memory for setting the operating differential phasing, and wherein the defined event is a malfunction of the sensor or the failure of the sensor. This refinement advantageously ensures that a normal efficiency-optimised operating mode with low power consumption for operating the space phasor may be maintained for energizing the stator, for as long as reliable position values on the position of the first axis of the rotor can be detected by means of the at least one sensor. If the sensor signal is lost or is no longer plausible, the system switches to an emergency mode which allows a reliable adjustment of the actuator member to any desired position or setting of the actuator member, without continuous position values of the position of the first axis of the rotor being available. For example, in this way at least one emergency running point or emergency setting of the actuator member can be reached.

With the method, it is however in principle also possible, after occurrence of the defined event i.e. for example after failure of the sensor, to adjust the actuator member permanently to any desired or externally predefined position or setting. Finally, in this way, operation of the positioning system is reliably possible even without continuous detection of the position values of the position of the first axis of the rotor. Thus for example, on use of such a positioning system in a motor vehicle, e.g. a throttle valve, or in a technical system, situations are avoided or postponed in which the operator of the motor vehicle or technical system must consult a workshop immediately after occurrence of the defined event. This may have advantageous safety aspects in that for example a motor vehicle need not be driven as far as the next garage in limp-home mode with the throttle valve only open slightly, which can be very difficult in hilly terrain with a fully loaded motor vehicle and constitutes a safety risk to other traffic on motorways.

According to a fourth aspect of the invention, a computer program product is provided which contains a program code which, when executed on a data processing unit, performs a method according to the first or second aspect of the invention. Such a computer program product is advantageously suitable for safely and reliably adjusting an actuator member in a positioning system e.g. even on failure of sensors.

DRAWINGS

Further features and advantages of the present invention will become clear to the person skilled in the art from the description below of exemplary embodiments, which should not however be interpreted so as to restrict the invention, and with reference to the enclosed drawings.

The drawings show.

All figures are merely diagrammatic depictions of devices or methods or their constituents according to the invention, according to exemplary embodiments of the invention. In particular, distances and size ratios are not shown to scale in the figures. In the various figures, corresponding elements carry the same reference numerals.

Figure 1A:
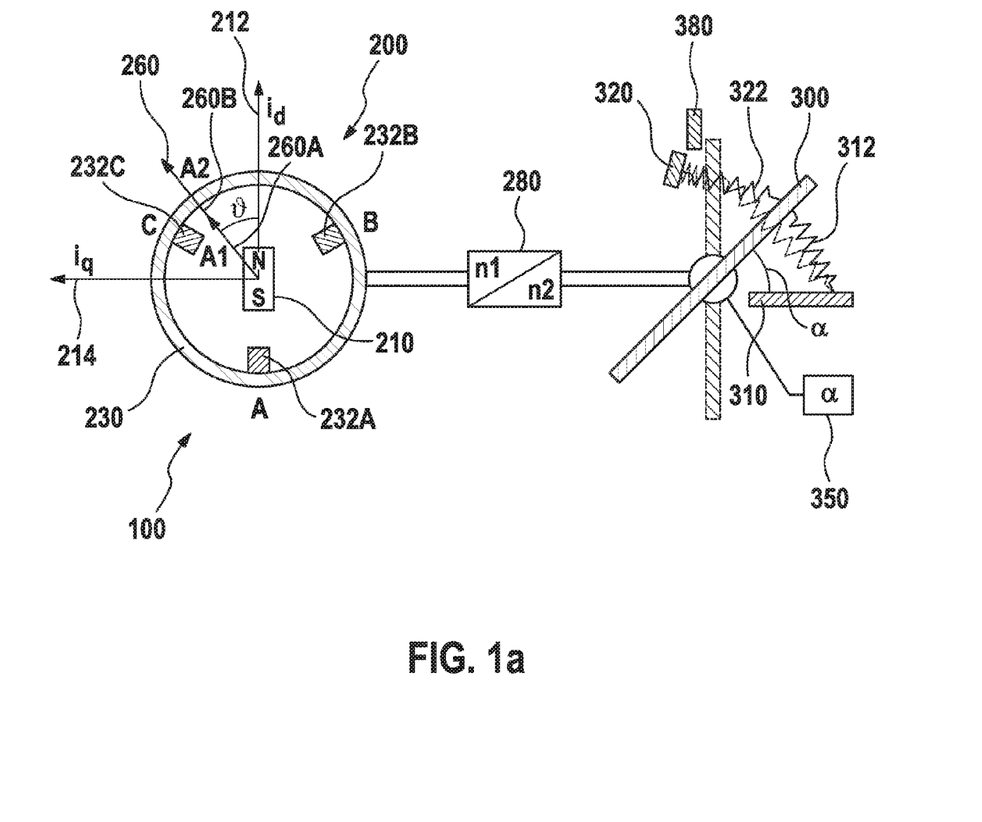
FIG. 1a a diagrammatic depiction of a positioning system.

FIG. 1a shows a positioning system 100 which can be controlled by a control unit (not shown). The positioning system comprises an electronically commutated actuator drive 200, e.g. a brushless electric motor.

The actuator drive 200 is coupled to an actuator member 300 via a gear mechanism 280 with a gear ratio G=n1:n2. The actuator drive 200 has a rotor 210 with permanent magnets, wherein the rotor has a first axis 212 which extends along a pole axis 290 of the rotor 210. The first axis 212 is normally designated the d-axis. The rotor 210 in addition has a second axis 214 oriented perpendicular to the first axis 212, which thus also stands perpendicular to the pole axis 290 and is conventionally known as the q-axis (in the rotor coordinate system).

The actuator drive 200 also has an electronically commutated stator 230 which in the embodiment shown has a pole pair count of 1. The stator thus has three energizable coils 232A, 232B, 232C which are arranged offset by 120° to each other. Correspondingly, with a pole pair count of 2, a total of six energizable coils would be provided, each offset by 60° to each other. The stator 230, or the coils 232A, 232B, 232C can be energized with a space phasor 260. The space phasor 260 can be described by polar coordinates. With regard to a positionally fixed coordinate system of the stator 230, the space phasor 260 can be unambiguously determined by an electrical phase $\phi_{el}$ which describes an angular value to a reference axis in the stator 230, and by an amplitude A which indicates the length of the space phasor 260 and is proportional to the size of the current loading the stator 230.

The electrical phase $\phi_{el}$ may assume any arbitrary positive or negative value, wherein in the positionally fixed coordinate system of the stator 230, the space phasor 260 always points in the same direction after a multiple of 360°. Thus the direction of the space phasor 260 in the positionally fixed coordinate system of the stator 260 can only reflect the electrical phase $\phi_{el}$ of the space phasor 260 up to a multiple of 360°. With regard to the rotor 210, the space phasor 260 has a differential phasing θ, wherein the differential phasing θ is the angle by which this space phasor 260 is rotated relative to the first axis 212 of the rotor 210 (in the positionally fixed coordinate system of the rotor 210). The differential phasing θ may by definition assume any angle between −180° and +180°. The rotor 210 with permanent magnets is now forced, due to the stator magnetic field caused by energizing of the stator coils 232, to orient itself with its pole axis 290 along this stator magnetic field. Thus a rotation of the space phasor 260 and the stator magnetic field co-rotating with the space phasor 260 causes a mechanical rotation of the rotor 210. The rotor 210 is thus rotated when the stator magnetic field applies a force or a torque resulting from this force on the rotor 210. In the state without a counter-torque, this can only be the case if the stator magnetic field and hence the space phasor 260 are rotated about a differential phasing of more than 0° relative to the first axis 212 of the rotor 210.

Viewed in a coordinate system of the stator 230, the rotor 210 with its mechanical angle phase thus follows the electrical phase of the space phasor 260 as long as the space phasor 260 has a sufficient amplitude A to overcome any counter-torque acting on the rotor 210. Assuming a state free from counter-torque, the mechanical phasing of the rotor, or the rotor position or the position of the first axis 212 of the rotor 210, is therefore unambiguously coupled to the electrical phasing $\phi_{el}$ of the space phasor 260. The term "position value L of the position of the first axis 212 of the rotor 210" can therefore be understood to be the mechanical angular rotation of the rotor 210 starting from an original state of 0°.

The drawing shows as an example two different space phasors 260 which have the same differential phasing θ relative to the rotor 210, but different lengths i.e. different amplitudes A. The space phasor designated 260A has a smaller amplitude A1 than the space phasor designated 260B with its amplitude A2. Also, space phasors 260 are shown which are designated $i_q$ and $i_d$. Here the space phasor 260 designated $i_d$ is oriented along the first axis of the rotor 210 and has a differential phasing θ of 0°. The space phasor 260 designated $i_q$ is oriented along the second axis 214 of the rotor 210 and has a differential phasing of 90°. In general, each space phasor 260 can be depicted as a linear combination of the space phasor 260 designated $i_q$ and the space phasor 260 designated $i_d$. The electrical phase $\phi_{el}$ of the space phasors 260 shown is here insignificant for the time being.

The right-hand part of FIG. 1a shows the actuator member 300 coupled to the actuator drive 200. The actuator member may for example be a throttle valve, a general-purpose actuator member, a charge movement valve, a control of an exhaust gas recirculation valve, or a screen wiper motor, or any other element arranged on an actuator member. The actuator member 300 is spring-loaded in the exemplary embodiment shown. A first abutment 310 for a first spring 312 is provided, wherein the first spring 312 is configured to move the actuator member 300 to the first abutment 310. Also, a second abutment 320 is provided for a second spring 322 which acts in the opposite direction to the first spring 312. In the exemplary embodiment shown, the actuator member 300 is for example in a position which is horizontal in the figure, i.e. a closed position resting on the first abutment 310. It can be moved counterclockwise up to a mechanical stop 380 about a mechanical phase or mechanical adjustment angle α. Such a movement can be provoked by rotation of the rotor 210 of the actuator drive 200. In non-energized state of the actuator drive 200, the actuator member 300 moves to a position in which the forces of the first spring 312 and the second spring 322 cancel each other out. In order to move the actuator member out of this position in one of the two directions, a torque is then necessary which acts against the springs. In the exemplary embodiment shown, a sensor 350 is provided on the actuator member which detects a position value of the actuator member 300.

Since the rotor 210 is unambiguously coupled to the actuator member 300 via the gear mechanism 280, by determining the position of the actuator member 300 i.e. the adjustment angle α, also the position value L of the first axis 212 of the rotor, i.e. the mechanical phase of the first axis 212 of the rotor 210 or the rotor position, can be unambiguously established. The mechanical phase a of the actuator member 300 is linked to the position value L of the first axis 212 of the rotor 210 via the following relation:

$$\alpha = L/G,$$

wherein G is the translation ratio G=n1:n2 of the gear mechanism 280.

Assuming that the space phasor 260 is sufficiently energized at any time to drag the rotor 210 with it, i.e. the force of the stator 230 acting on the rotor 210 is greater than e.g. the counter-force from the first spring 312 which increases as the actuator member 300 opens further, then the mechanical phase of the actuator member 300 is also unambiguously coupled to the electrical phase $\phi_{el}$ of the space phasor 260, following the relation:

$$\alpha = L/(G*NP),$$

wherein NP is the pole pair count of the stator.

With a pole pair count of NP=1 and a gear ratio of G=40:1, one rotation of the space phasor 260 by 3600° corresponds to one revolution of the first axis 212 of the rotor 210 by also 3600°, and causes a mechanical rotation of the actuator member 300 by an adjustment angle α of 90°. It is evident that other gear ratios are also possible, e.g. G=20:1.

Figure 1B:
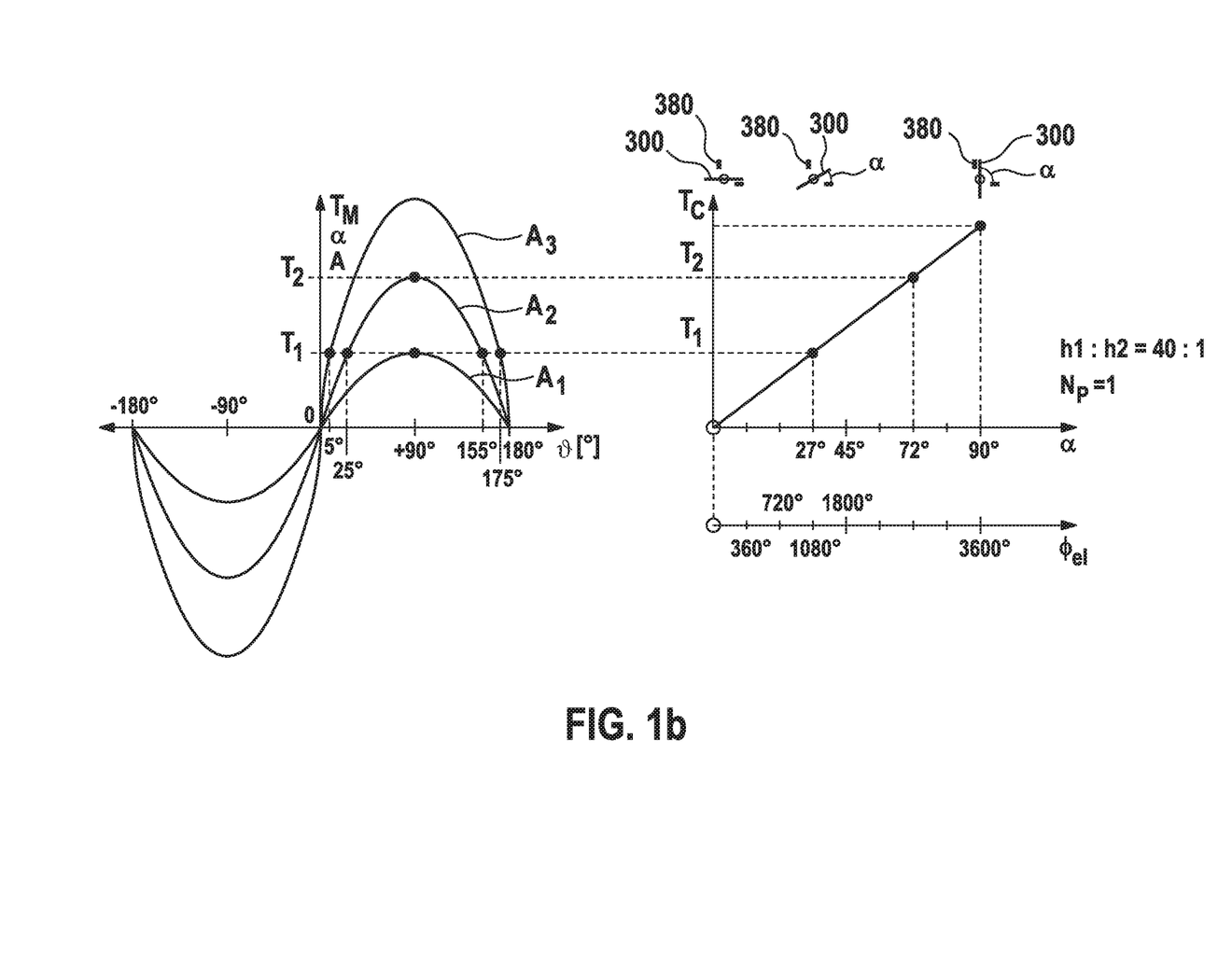
FIG. 1b a depiction of the torque exerted by the stator on the rotor for various amplitudes and differential phasings of the space phasor running around the stator, and a depiction of the counter-torque acting on the actuator member as a function of the rotary angle of the actuator member.

FIG. 1b shows on the right-hand side a depiction of the counter-torque $T_C$ acting on the rotor 210 as a function of the adjustment angle α of the actuator member 300. For the sake of simplicity, a linear correlation is assumed for the functional connection between the counter-torque $T_C$ and the adjustment angle α of the actuator member 300, as given for example for a spring in Hookes' law. Evidently, a different functional correlation may exist between the counter-torque $T_C$ and the rotary angle or adjustment angle α. In order therefore to adjust the actuator member in the direction of a greater adjustment angle α, a greater counter-torque $T_C$ at the rotor 210 must be overcome. Such a torque $T_C$ is finally provided by the actuator drive 200. This means that as the adjustment angle α of the actuator member 300 increases, the torque exerted by the space phasor 260 on the rotor 210 must also increase.

FIG. 1b shows on the left-hand side a depiction of the torque $T_M$ exerted on the rotor 210 by the stator 230 for different amplitudes A and differential phasing θ of the space phasor 260 energizing the stator 230. The differential phasing θ is here shown from −180° to +180°. As already described above, for a differential phasing of 0° under ideal conditions, a state exists in which no torque is exerted by the space phasor 260 on the first axis 212 of the rotor 210, since the space phasor 260 and the first axis 212 are in this case arranged co-linear to each other.

In other words, in this case the space phasor 260 has no component in the direction of the q-axis, i.e. the second axis 214 of the rotor 210, which alone can exert a torque on the rotor 210. With a differential phasing of −90° and +90°, the torque exerted by the space phasor 260 on the first axis 212 of the rotor 210 is at a maximum. In other words, consequently, with a differential phasing θ of around 90°, i.e. a fixed amplitude, the greatest torque can be achieved, or for a predefined torque $T_M$ to be achieved, this can be achieved at a differential phasing θ of 90° with a smaller amplitude than at any other differential phasing θ. Thus the actuator drive 200 can be operated for optimum efficiency with a differential phasing θ of around 90°, since the smallest power consumption or smallest amplitude of the space phasor 260 is thus required to achieve a predefined torque $T_M$.

Looking now at the left- and right-hand sides of FIG. 1b together, for each adjustment angle α of the actuator member 300, a counter-torque $T_C$ can be determined which must be exerted by the magnetic field of the stator 230, provoked by the space phasor 260, on the rotor 210 in order to achieve or maintain the adjustment angle α of the actuator member 300. In order to achieve or maintain the adjustment angle of 27° shown as an example on the right-hand side, a value T1 of the counter-torque $T_C$ is required. Above the diagram, the adjustment angle position of the actuator member 300 for some adjustment angles α is shown diagrammatically.

Thus a space phasor 260 must be provided which generates a torque $T_M$ of T1 against the rotor 210. Finally, for each adjustment angle α, $T_M = T_C$. As shown on the left-hand side of FIG. 1b, this can be achieved with a space phasor 260 with an amplitude A3 for a differential phasing of for example 5° or 175°. If a space phasor with an amplitude A2 is used, wherein A2 is less than A3, the differential phasing necessary to achieve T1 is for example 25° or 155°. If however a space phasor 260 is used with an efficiency-optimised amplitude A1 which is less than A2, the torque T1 is reached only with a differential phasing of 90°.

At even smaller amplitudes, the counter-force (e.g. of the first spring 312) rotates the actuator member 300 and the rotor 210 coupled thereto back until the torque equation is again fulfilled, i.e. the counter-torque $T_C$ is compensated by the torque $T_M$ generated by the amplitude and the differential phasing θ.

For an adjustment angle α of 72°, a second counter-torque T2 applies which is greater than the first counter-torque T1. Thus it is necessary to also provide a second torque at the rotor. In the exemplary depiction, this can be achieved at a differential phasing θ of 90° with the amplitude A2 or a greater amplitude, wherein then a differential phasing θ other than 90° is sufficient.

Finally, it results from this that to achieve a torque of T1, a solution space exists with various combinations of differential phasings θ and amplitudes A, wherein for a differential phasing θ of 90° there is only one suitable amplitude $A_u$, wherein this amplitude $A_u$ has the lowest value of all amplitudes of this solution space. At the same time, for ever smaller differential phasings, an ever greater amplitude is required in order to provide the desired torque T1. Thus the lower limit of the differential phasing down to the value 0° or the upper limit up to the value of 180° is finally determined for constructional reasons by the maximum available amplitude $A_o$ (i.e. for example by the current carrying capacity of the stator coils 232). In order to keep the installation space as small as possible and at the same time keep the energy consumption as low as possible, it is therefore normal to operate such electronically commutated motors or actuator drives 200 for optimum efficiency. In the real world, the efficiency-optimised differential phasing may deviate from 90° due to the counter-torque and internal friction forces. Thus slightly higher amounts are sensible for high rotation speeds, whereby higher moments can be achieved due to weakening of the magnetic rotor flux. The precise values for the differential phasing θ and the amplitude A of the space phasor 260 can be determined by various ways, e.g. using a so-called field-oriented method (FOR method) with direct measurement of the phase currents. In each case, to set the space phasor in efficiency-optimised mode, i.e. at differential phasings of around 90°, continuous information on the position of the first axis 212 of the rotor 210 is required.

The electrical phase $\phi_{el}$ of the space phasor 260 corresponding to each adjustment angle α according to the design of the positioning system 100 is shown on a second x-axis which is arranged below the first x-axis with adjustment angles α. This corresponds to the mechanical phase of the rotor 210 insofar as the rotor 210 has not undergone any slippage.

Figure 2:
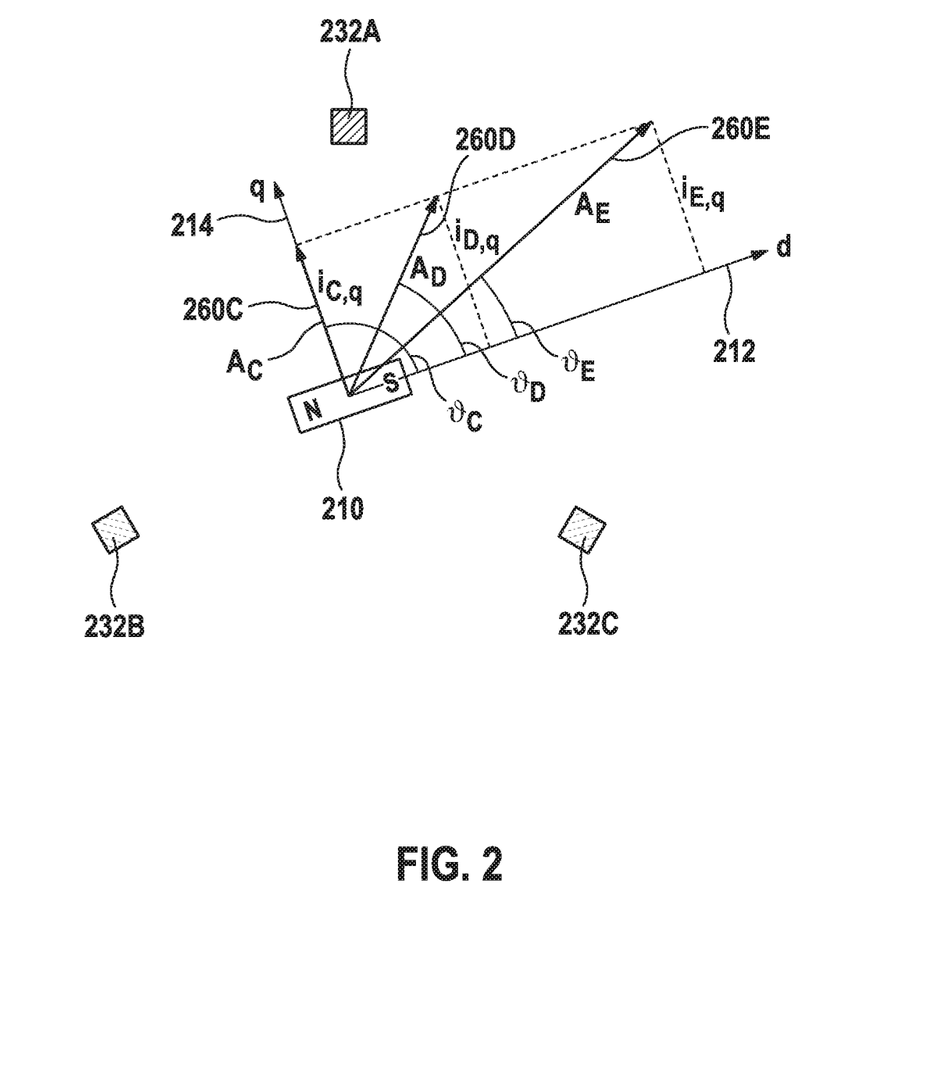
FIG. 2 a depiction of various space phasor vectors which exert the same torque on the rotor.

FIG. 2 shows in detail the correlation between the rotor 210 with its first axis 212 and with its second axis 214 and three different space phasors 260C, 260D and 260E. All three space phasors 260C, 260D and 260E exert the same torque on the rotor 210. This is because all three space phasors 260C, 260D, 260E have the same vector components $i_{C,q}$, $i_{D,q}$ and $i_{E,q}$ in the direction of the second axis 214 of the rotor 210. Since all three space phasors 260C, 260D, 260E however have different differential phasings $\theta_C$, $\theta_D$, and $\theta_E$, they must have differently sized amplitudes $A_C$, $A_D$, $A_E$ in order to achieve the desired torque T1. The closer the differential phasing θ comes to the first axis 212 of the rotor 210, the greater the amplitude A must be to generate the same vector component in the direction of the second axis 214 of the rotor 210.

Figure 3A:
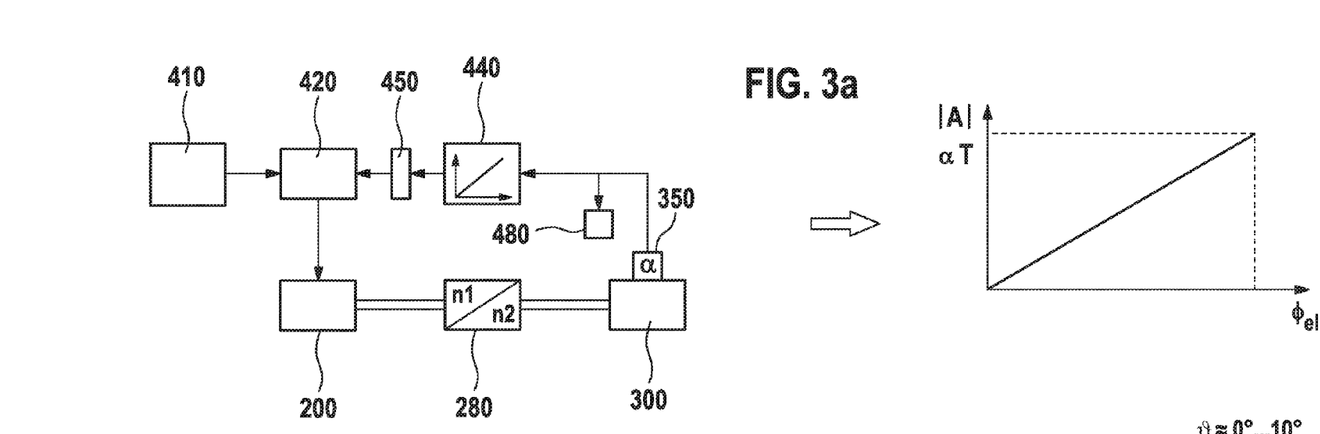
FIG. 3a a depiction of the method process in normal operation.

FIG. 3a on the left-hand side shows a control circuit for implementing a method for setting the actuator member 300 to a desired value. In a step 410, an adjustment angle default $\alpha_{Soll}$ or a torque default $T_{Soll}$ proportional thereto, which the actuator member 300 must achieve, is fed into a control 420 for the actuator drive commutation or for generating a suitable space phasor 260. This value may be temporarily stored in the control 420. Another embodiment may also be possible in which this value is stored in a separate memory 480, either in addition to storage in the control 420 or instead of storage in the control 420. The space phasor 260 energizes the stator 230 of the actuator drive 200, whereby the rotor 210 is to be rotated to a desired position value $L_{Soll}$. By means of the gear mechanism 280, the actuator member 300 is thus also moved. A sensor 350 arranged on the actuator member 300 detects the position of the actuator member 300 and hence indirectly a position value L of the first axis 212 of the rotor 210. This sensor 350 may, as shown in FIG. 3a, be a rotary angle sensor or—in other embodiments not shown here—a position sensor for detecting a translational position. This position value L is firstly supplied to the memory 480. Secondly, with knowledge of a rotor position characteristic curve 440, it is determined how far the electrical phase $\phi_{el}$ of the space phasor 260 must still be rotated in order to reach the target value $\alpha_{Soll}$ or the torque $T_{Soll}$. Before the result is supplied to the control 420 of the actuator drive commutation, it is checked in a sensor signal evaluation means 450 if the sensor signal of the sensor 350 is plausible or even present. If the result of the check in the check step 450 is valid, the control 420 of the actuator drive commutation is informed of how much further the space phasor must be rotated in order to reach the target value $\alpha_{Soll}$ or $T_{Soll}$. In this normal operating mode, the actuator drive 200 is preferably operated for optimum efficiency, i.e. with an operating differential phasing $\theta_O$ which lies in a range between 45° and 135°, preferably in a range between 70° and 110°, and quite particularly preferably in a range between 85° and 110°. Ideally, the operating differential phasing $\theta_O$ is around 90°.

The right-hand side of FIG. 3a shows diagrammatically how, with the increasing electrical phase $\phi_{el}$ of the space phasor 260 on the x-axis, the amount of the amplitude A of the space phasor 260 on the y-axis must be increased in order to compensate for the counter-torque $T_C$ in efficiency-optimised mode. The amplitude A of the space phasor 260 corresponding to the electrical phase $\phi_{el}$ is assigned by the control 420 using the rotor position characteristic curve.

Figure 3B:
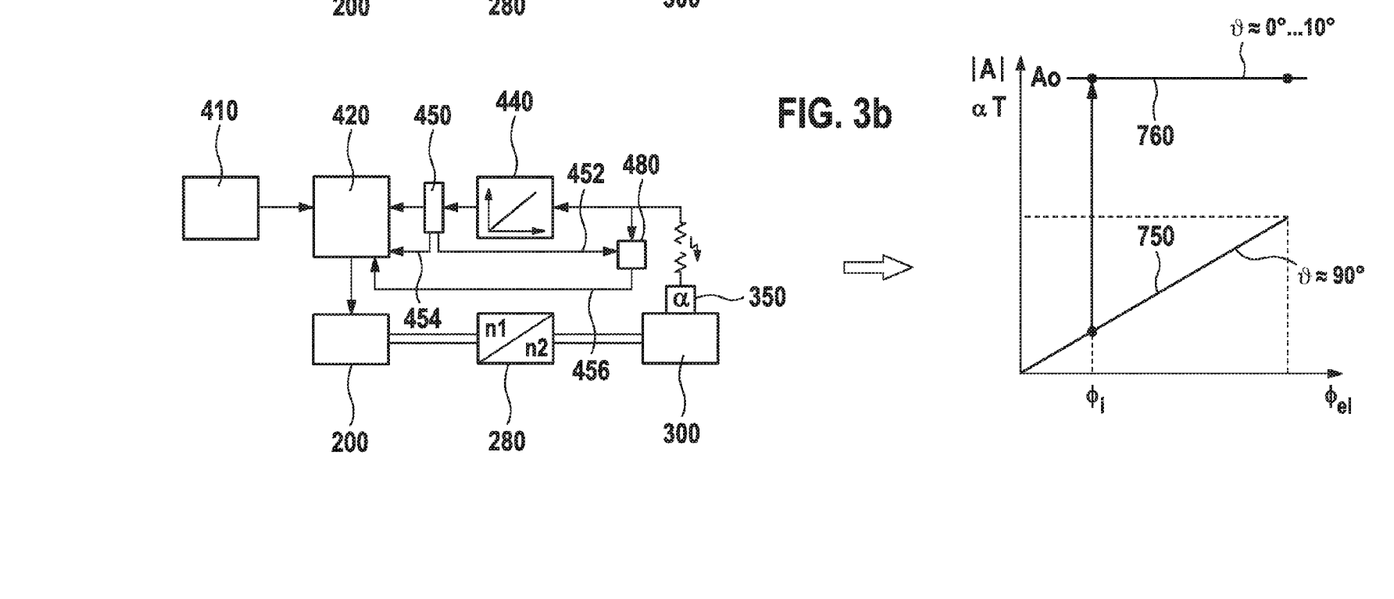
FIG. 3b a depiction of the method process after occurrence of the defined event.

FIG. 3b shows a state in which it was established in check step 450 that the sensor signal from sensor 350 is not plausible, or that the sensor signal has been lost completely. In this case which, in the exemplary embodiment shown of the method, corresponds to a defined event, the check step 450 triggers a retrieval of a plausible position value L from the memory 480 as depicted by arrow 452. Also, the associated value of the adjustment angle default $\alpha_{Soll}$ or the torque default $T_{Soll}$ proportional thereto which the actuator member 300 must reach, is retrieved from the control 420 and/or from the memory 480. A plausible position value L may for example be the last available valid position value L or a sliding mean or another average or calculation from several stored position values L of the memory 480. At the same time, the check step 450 sends a signal, depicted by arrow 454, to the control 420 of the actuator drive commutation which shifts the space phasor control from normal operating mode to an emergency operating mode.

In emergency operating mode, due to the absence of available plausible position signals of the actuator member 300 and/or the rotor 210 of the actuator drive 200, the space phasor 260 is no longer controlled for optimum efficiency. Also, the actuator drive commutation receives the position value L retrieved from the memory via a signal path according to the arrow 456. Starting from this position value L and the associated last space phasor 260 applied with amplitude A and differential phasing θ, and from the electrical phase $\phi_{el}$ of the space phasor 260, the differential phasing θ—which in normal mode is at least 45°, ideally at least 70°, preferably at least 90°—is immediately changed to an operating differential phasing $\theta_O$ of less than 45°, ideally approximately between 0° and 10°, and simultaneously the amplitude A of the space phasor 260 is increased to an operating amplitude $A_O$. The combination of operating amplitude $A_O$ and operating differential phasing $\theta_O$ is selected such that on the first axis 212 of the rotor 210, over the total path to be covered from the current position of the actuator member 300 for the retrieved position value L to the predefined desired position of the actuator member 300, the space phasor 260 exerts a greater torque $T_M$ than the maximum counter-torque $T_C$ occurring on the path. This is indicated on the right-hand side of the diagram by the sudden transition of the rising curve 750 to the horizontal curve 760 with constant operating amplitude $A_O$. There is also a phase jump in the differential phasing θ.

In other words, the method is based on a phase jump of the differential phasing θ and an amplitude jump of the space phasor 260. From the position value L made available from the memory 480, it is also determined by which value the electrical phase $\phi_{el}$ of the space phasor 260 must be changed in order, from the position value L of the first axis 212 of the rotor 210, retrieved from the memory, to reach the position value $L_{Ende}$ of the first axis 212 of the rotor 210 at which the predefined position of the actuator member 300 is reached. The control 420 of the actuator drive commutation now changes the electrical phase $\phi_{el}$ of the space phasor 260 until the predefined position value $L_{Ende}$ is reached. Because the torque $T_M$ exerted by the space phasor 260 on the rotor 210 is always greater than the maximum counter-torque $T_C$, the rotor 210 thus follows the space phasor 260, and the actuator member 300, which is coupled to the actuator drive 200 via the gear mechanism 280, moves to the predefined position of the actuator member 300.

In the case of a total sensor failure (e.g. for loss of sensor supply voltage, fault in sensor transmission, conversion error), for actuator members with electrically commutated actuator drive 200, by means of the method described the controllability (positionability) of the actuator or actuator member 300 can be maintained. If a sudden total sensor failure occurs for several sensors 350 (failure of all sensors 350), controllability is retained by rapid switching to controlled operation of the actuator drive 200 in emergency mode (high amplitude A of the space phasor 260 in the direction of the first axis 212). Thus, based on the last adapted correlation between the sensor signal (valve position or adjustment angle α or translational position) and the rotor position or the position of the first axis 212 of the rotor 210, the actuator member 300 can still be positioned or adjusted with great precision. In principle, using the method, normal operation with different electrical phases $\phi_{el}$ can be maintained, i.e. the actuator member 300 can still be controlled in differentiated fashion and is not fixed at a single predefined position. Rather, the "predefined position in each cycle of the control" means the position which corresponds to the value of the adjustment angle default or torque default from step 410. This is accompanied by a higher power consumption of the stator 230 in an operating mode not optimised for efficiency.

Figure 4:
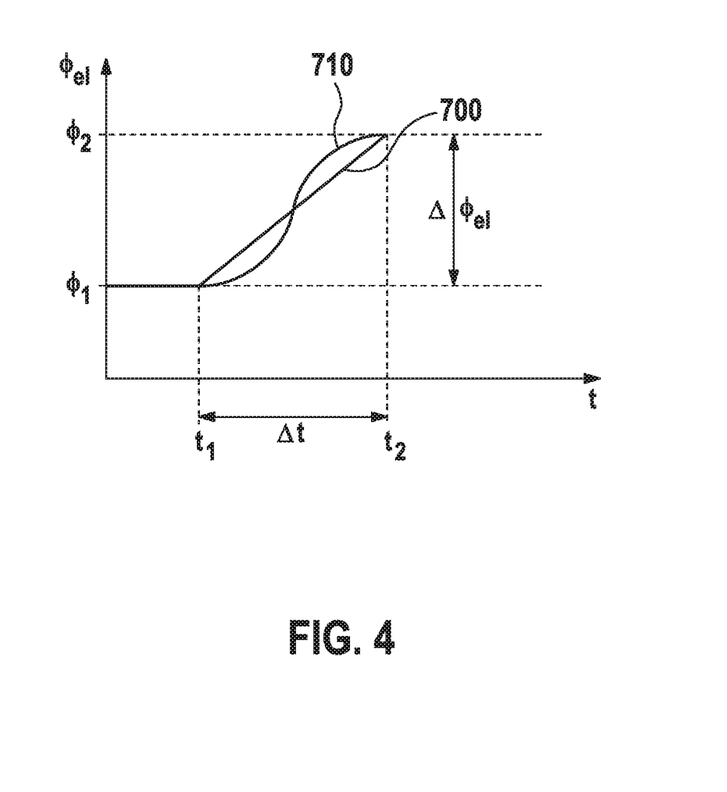
FIG. 4 a depiction of the control of the electrical phasing of the space phasor from a first position to the position at the predefined position of the actuator member.

FIG. 4 shows an optimised trajectory plan. The y-axis depicts the electrical phase $\phi_{el}$ of the space phasor 260, and the x-axis depicts the time. It can now be assumed e.g. that for a first electrical phase $\phi 1$, the defined event e.g. a sensor failure occurs at a first time t1, and to reach the predefined position of the actuator member 300, a second electrical phase $\phi 2$ of the space phasor 260 is required which should be reached in a time Δt for example of less than 300 ms or less than 100 ms.

Then, on switching from normal operating mode to emergency operating mode, the control could in principle simply traverse the electrical phase along a straight (line 700 in FIG. 4) from the first electrical phase $\phi 1$ to the second electrical phase $\phi 2$ with constant phase change rate, or simply jump to the value $\phi 2$. Here however there is a risk that, on transition from a state before the first time or on transition after reaching the second phase after the second time t2, the mechanical components, i.e. for example the rotor 210 and the actuator member 300, may be subjected to sudden and strong accelerations or brakings. This is because the rotor 210 has a certain inertia moment on accelerations or on brakings in relation to the very rapid energizing of the coil 232. In order to prevent such loads on the mechanical components of the rotor 210 and/or the actuator member 300, an algorithm may be applied for changing the electrical phase $\phi_{el}$ of the space phasor 260 which ensures that on a change of the electrical phase from the first electrical phase $\phi 1$ to the second electrical phase $\phi 2$, no discontinuities occur in the time development. This is depicted for example in the S-shaped curve 710 in FIG. 4, which can be differentiated on the left- and right-hand sides at any time. Here, after switching to an emergency operating mode, starting from the first electrical phase $\phi 1$, the electrical phase $\phi_{el}$ is changed slowly at first in order then to reach a high change rate as soon as the rotor 210 with its mechanical inertia can follow the space phasor 260. Towards the end of the adjustment of the electrical phase, i.e. before reaching the second electrical phase $\phi 2$, the phase change rate is then reduced and slowed ever more greatly so that the inertia moment of the rotor 210 cannot turn the same beyond the target position. Such a curve path can for example be achieved by suitable filtering for example using a low-pass filter or a band-pass filter.

Such a filter element for optimised trajectory planning in the form for example of an electronic circuit may be provided in the flow diagrams of FIGS. 3a and 3b, for example between step 410 of setting the adjustment angle default $\alpha_{Soll}$ or a torque default $T_{Soll}$ proportional thereto, and the control 420. Alternatively or additionally, it may be provided between the check step 450 and the control 420.

The actuator member 300 may for example be mounted rotatably, such as e.g. a throttle valve. Also, an embodiment (not shown here) is possible in which the actuator member 300 performs a translational movement instead of a rotational movement when the actuator drive 200 is controlled. Thus, the actuator member 300 may for example be configured as a wastegate actuator. An actuator member 300 operated translationally may on the output side have a piston rod which can be moved in translation, for example in a range from e.g. 5 mm to 300 mm, preferably from 10 mm to 30 mm. For wastegate actuators, such a translational actuator member 300 is advantageous because of the movement type. However, various other actuators are conceivable as wastegate actuators, for which a translational movement is advantageous.

It is also conceivable that the position is not detected by means of an angle sensor, but that a sensor detects the transitional position which is then converted, by means of a map or functional correlation, into the rotor position of the actuator drive 200 in order thus to commutate the actuator drive 200.

The invention claimed is:

1. A method for adjusting an actuator member of a positioning system,
wherein the positioning system has an electronically commutated actuator drive which is coupled to the actuator member,
wherein the actuator drive has a rotor with permanent magnets, wherein the rotor has a first axis which extends along a pole axis of the rotor,
and wherein the actuator drive has an electronically commutated stator,
wherein the stator can be energized with a space phasor, wherein the space phasor has an electric phase $\phi_{el}$ and an amplitude A, wherein the space phasor is oriented about a differential phasing θ relative to the first axis of the rotor,
characterized in that
the method comprises the following steps for controlling a predefined position of the actuator member:
setting the differential phasing θ of the space phasor to an operating differential phasing $\theta_O$, setting the amplitude A to an operating amplitude $A_O$, wherein the operating differential phasing $\theta_O$ and the operating amplitude $A_O$ are set such that the operating differential phasing $\theta_O$ is less than 45°, and that a torque is generated which acts on the rotor and is suitable for approaching the predefined position of the actuator member.

2. The method according to claim 1, characterized in that the positioning system comprises means for detecting a position value L of the position of the first axis.

3. The method according to claim 2, characterized in that the means comprise at least one calibration step for determining a position value L.

4. The method according to claim 1, characterized in that at the predefined position of the actuator member, the actuator member is fully opened and/or the actuator member comes to rest on a mechanical stop.

5. The method according to claim 1, characterized in that the predefined position of the actuator member is reached in less than 300 ms, in particular in less than 100 ms.

6. The method according to claim 1, characterized in that the control for rotating the electrical phase $\phi_{el}$ of the space phasor takes place such that the depiction of the phase control values over the control time gives a curve which can be differentiated at any time, i.e. in particular the left-side derivative at any time corresponds to the right-side derivative.

7. The method according to claim 1, characterized in that the method is performed only after the occurrence of a defined event, wherein without the occurrence of the defined event for adjusting the position of the actuator member, the space phasor is oriented relative to the first axis of the rotor by a differential phasing $\theta$ which lies in a range between 45° and 135°, in particular in a range from 70° to 110°.

8. The method according to claim 1, characterized in that the means for detecting a position value L of the position of the first axis are at least one sensor arranged on the actuator member and/or at least one sensor arranged on the actuator drive.

9. The method according to claim 1, characterized in that the positioning system comprises a memory for storing position values L of the position of the first axis, and that on occurrence of the defined event, a position value L is retrieved from the memory in order to set the operating differential phasing $\theta_O$.

10. The method according to claim 1, characterized in that the defined event is a malfunction of the sensor or the failure of the sensor.

11. The method according to claim 1, characterized in that the predefined position of the actuator member is a position in which the actuator member comes to rest on a mechanical stop, wherein a differential phase angle $\Delta\phi$ of the electrical phase $\phi_{el}$ of the space phasor results from the difference between a first electrical phase $\phi_1$ of the space phasor at the predefined position and a second electrical phase $\phi_2$ of the space phasor which the space phasor has at the position value L retrieved from the memory plus a multiple of 360°, in particular plus 720°.

12. A computer program product which contains a program code which, if executed on a data processing unit, performs the method according to claim 1.

13. A device for adjusting an actuator member of a positioning system, wherein the positioning system has an electronically commutated actuator drive which is coupled to the actuator member, wherein the actuator drive has a rotor with permanent magnets, wherein the rotor has a first axis which extends along a pole axis of the rotor, and wherein the actuator drive has an electronically commutated stator, wherein the stator can be energized with a space phasor, wherein the space phasor has an electrical phase $\phi_{el}$ and an amplitude A, wherein the space phasor can be oriented about a differential phasing $\theta$ relative to the first axis of the rotor, characterized in that the device is configured to approach a predefined position of the actuator member in that:

the space phasor can be controlled such that the differential phasing $\theta$ can be set to an operating differential phasing $\theta_O$, wherein the space phasor can be controlled such that the amplitude A can be set to an operating amplitude $A_O$, wherein the operating differential phasing $\theta_O$ and the operating amplitude $A_O$ can be set such that the operating differential phasing $\theta_O$ is less than 45°, and the space phasor generates a torque acting on the rotor and suitable for approaching the predefined position of the actuator member.

14. The device according to claim 13, characterized in that the device is configured to approach a predefined position of the actuator member in a normal operating mode, in that the space phasor can be oriented relative to the first axis of the rotor about a differential phasing $\theta$ of more than 45°, in particular about a differential phasing $\theta$ of more than 70°, wherein the amplitude A can be set such that the space phasor generates a torque acting on the rotor and suitable for approaching a predefined position, and that the device is furthermore configured to approach the predefined position of the actuator member only after occurrence of a defined event, in that the operating differential phasing $\theta_O$ and the operating amplitude $A_O$ can be set such that the operating differential phasing $\theta_O$ is less than 45°, and that the space phasor generates a torque acting on the rotor and suitable for approaching the predefined position.

15. The device according to claim 13, characterized in that the positioning system comprises means for detecting a position value L of the position of the first axis, wherein the means for detecting the position value L are at least one sensor arranged on the actuator member and/or at least one sensor arranged on the actuator drive, wherein the positioning system comprises a memory for storing position values L of the position of the first axis, and wherein on occurrence of the defined event, a position value L is retrieved from the memory in order to set the operating differential phasing $\theta_O$, and wherein the defined event is a malfunction of the sensor or the failure of the sensor.

* * * * *